United States Patent Office 2,907,979
Patented Oct. 6, 1959

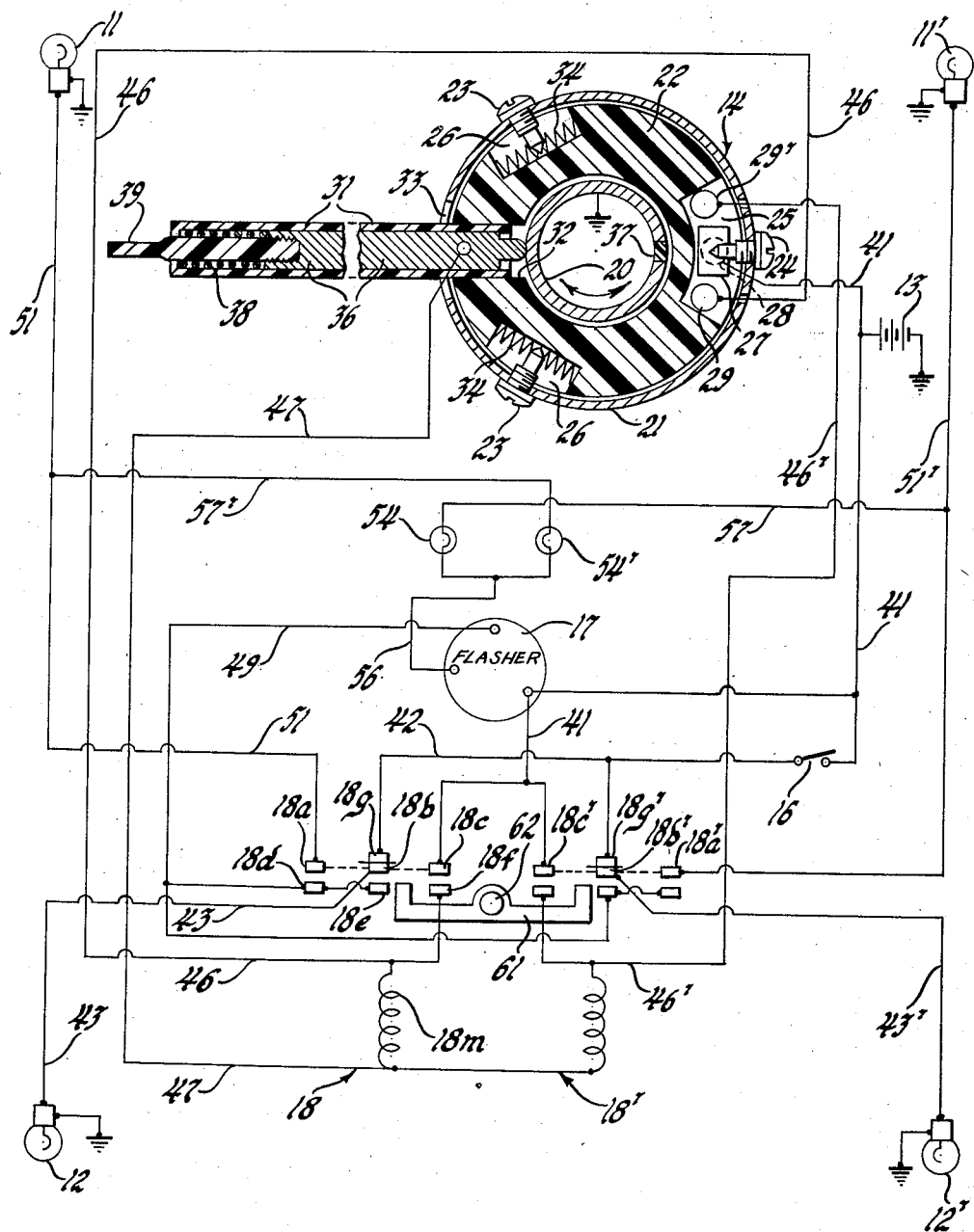

2,907,979

DIRECTION SIGNAL

Argyle G. Lautzenhiser, Anderson, Ind., assignor to General Motors Corporation, Detroit, Mich., a corporation of Delaware Application December 30, 1954, Serial No. 478,724

8 Claims. (Cl. 340—54)

My invention relates to signaling systems, particularly automobile turn signal systems. The usual automobile turn signal system employs a rather simple electrical circuit with a rather complicated manually set initiating device for the signals. The complications of the device are the result of provisions for automatic cancelling of the signal and manual override of the cancelling structure. My direction signal system eliminates such mechanical complexities while retaining the convenience of present direction signals.

This is achieved by the addition of a relatively simple relay arrangement to the electrical system by which the mechanical complexities are superseded.

The principal object of the invention is to provide a simple, reliable and economical direction signal system.

The nature of the invention and the advantages thereof will be more clearly apparent from the succeeding description and from the accompanying drawing in which:

The figure is a circuit diagram of a direction signal system including a somewhat schematic sectional view of the manually operable switch device.

By way of general introduction to the detailed description, the direction signal system according to the preferred embodiment of the invention comprises a manually operable single-pole double-throw switch rotatable about the steering shaft, with a handle adjacent the rim of the steering wheel. This switch is self-centering and remains open unless held closed. Depending upon the contact closed by the switch, a right hand or a left hand turn signal relay is energized, each relay closing a self-holding circuit through a front contact thereof to hold the relay energized when the manual switch opens. The handle of the switch may be pulled outward from the axis to break a normally closed contact in the holding circuits of both relays to cancel the signal if desired. This contact cooperates with an insulated segment on the rotatable steering shaft so that the holding circuit is broken when the steering wheel is rotated substantially.

An interlock is provided between the two relays (which as shown is a mechanical interlock) so that when one relay is pulled up, the other is held against closing. The relays actuate direction signal circuits similar to those presently operated by the involved mechanical actuators referred to above so that the direction signals are operated similarly to present known systems, the relays superseding the present complicated mechanical provisions for automatic cancelling of the signal and for override.

Since, in general, the system comprises left hand circuits and elements and right hand ones as well as some parts common to both sides of the system, in the succeeding description all parts for the right hand circuit which duplicate parts for the left hand circuit will be identified by the same numerals with the addition of a prime. In general, therefore, it will not be necessary to describe the right hand circuit in detail since the description of the left hand circuit applies thereto.

The left turn signal system is coupled to a front left turn signal light 11 and a rear left stop and turn signal light 12. These are energized from the battery 13 through the manual turn signal switch identified generally as 14, the brake or stop signal switch 16, a flasher 17, and a relay 18.

The switch 14 is mounted within the steering column 21 and cooperates with the rotatable steering shaft 20, which is grounded. The switch comprises an annular body 22 of rigid insulating material having three more or less equally spaced slots in its periphery. The body 22 is mounted for limited oscillation around the axis of the steering shaft by screws 23 and a screw 24, these screws being threaded through the steering column. The screws 23 extend into slots 26 in the body and the screw 24 extends into a slot 25. The screw 24 has mounted thereon a switch contact 27. Contact 27 engages center contact 28, and may connect it to a left turn contact 29 or a right turn contact 29', these contacts being mounted on the body 22 and extending into the slot 27. Contacts 28, 29 and 29' are connected to external circuits in any suitable manner, as by flexible leads, to accommodate limited rotation of the switch body. The body is rotated by an arm 31 fixed in a radial bore 32 in the body which is allowed limited oscillation by a circumferential slot 33 in the steering column. The switch body is biased toward its neutral position by coil springs 34 in the slots 26 which extend from the ends of the slots to engage the ends of screws 23. Rotation of the body 22 causes fixed contact 27 to bridge between center contact 28 and either of contacts 29 and 29', this structure thus constituting a single-pole double-throw switch by which the left and right turn signal lights are energized.

The switch mechanism 14 also includes a cancelling contact mechanism. A contact 36 reciprocably mounted in the hollow handle 31 engages the steering shaft 20, which is shown in its normal centered position. If the steering shaft is rotated approximately 180°, an insulating segment 37 in the steering shaft rides under the contact 36 to break the circuit from 36 to ground through the steering shaft. This contact may also be broken by pulling contact 36 radially outwardly, against the force of a spring 38 caged in the outer end of the handle 31, by means of a handle 39.

Considering now the operation of the signal circuits as shown in the drawing, note that the turn signal is not energized and the stop signal switch 16 is open. If the brakes are operated, switch 16 is closed, completing a circuit from the battery through lead 41, switch 16, lead 42, back contact 18g and movable contact 18b of relay 18, lead 43, and left rear signal light 12 to ground. The right rear signal light 12' is similarly energized through the contacts of relay 18'.

We may now assume that the driver signals a left turn by rotating switch body 22 counterclockwise by handle 31, 39. When this is done, fixed contact 27 bridges contacts 28 and 29, completing a circuit from the battery 13 through lead 41, contacts 27, 28, 29, lead 46, coil 18m of relay 18, lead 47, contact 36 in the handle, and steering shaft 20 to ground, thus energizing the left turn relay 18 and engaging movable contacts 18a, 18b, and 18c with fixed front contacts 18d, 18e and 18f, respectively. This breaks the circuit from the stop switch to the left turn signal light 12 at contact 18g. It completes a self-holding circuit for relay 18 from lead 41 through contacts 18c and 18f, the relay coil, lead 47, and contact 36. The flasher 17 is connected to the battery 13 through lead 41 and to contacts 18d and 18e through lead 49. When the relay is energized the rear light 12 is energized from the flasher through lead 49, contacts 18e and 18b, and lead 43, and the front signal light 11 is energized from the flasher through lead 49, contacts 18d and 18a, and lead 51. These lights are thus caused to flash in the usual manner.

The flashing continues until the steering post is turned approximately 180° to break the holding circuit of the relay at insulating segmment 37, whereupon the relay drops out and the signal is cancelled. If the driver should change his mind, the same result is effected by pulling out momentarily on hand grip 39 to break the circuit between contact 36 and the steering shaft. If the brakes are applied while the left signal lights are flashing, the right signal light 12' will be energized through back contact 18g' of relay 18' and lead 43' and will be continuously illuminated.

The left pilot light 54 is connected by a lead 56 to the pilot light contact of the flasher 17 and through lead 57 to the lead 51' by which the front right signal light 11' is energized. The right turn pilot light 54' is similarly connected to the left turn signal. The flasher may be of known commercial type, and this connection of the pilot lights to ground through the signal lights of the opposite side is according to known practice.

Since either relay 18 or 18' may be energized by movement of the switch 14, it would be possible in the absence of some interlock between the left and right signals to energize both sets of signals by operating the switch in both directions successively without deenergizing the circuit first energized. Of course, the signal could be cancelled manually by breaking contact at 36, but it is preferable to provide a mechanical or electrical interlock between the right and left signal circuits. As illustrated herein, this interlock is provided by a rocker bar 61 pivotally mounted on a shaft 62 suitably supported by structure not illustrated so that the bar 61 is so situated with respect to the movable armatures of the relays 18 and 18' (which are illustrated in the drawing by the broken lines connecting the contacts 18a, 18b and 18c on the one hand and 18a', 18b' and 18c' on the other hand) that when either relay is energized and the armature is pulled up to close the front contact, the bar 61 is engaged and rocked about the axis of the shaft 62. For example, if relay 18 is energized, bar 61 is rocked counterclockwise and the right hand end as shown in the figure moves upwardly, blocking the relay 18' against movement of the armature to close the front contacts. The same result could be achieved in various other ways, one being an arrangement whereby the energizing circuit of each of the relays 18 and 18' is run through a back contact of the other relay. Such an interlock between relays is widely known.

It is believed that the operation will be clear from the foregoing description. Either the right or the left turn signals may be energized by movement of switch 14 from its central position, whereupon the switch is released and returns to neutral. The appropriate relay remains energized, connecting the signal lights to the flasher, until the relay is deenergized by rotation of the steering shaft or by manual breaking of the holding circuit at contact 36.

It will be apparent that the two relays 18 and 18' would constitute a single assembly which could be of quite simple nature, and the mechanical simplicity of the switch 14 is evident. The advantages of the invention in elimination of complex mechanical switch actuating structures will, therefore, be clear to those skilled in the art.

The detailed description herein of the preferred embodiment of the invention for the purpose of explaining the principles thereof is not to be regarded as limiting the invention, as many modifications may be made within the scope of the invention by the exercise of skill in the art.

I claim:

1. A turn signal system comprising, in combination, right and left turn signals, a right turn signal relay and a left turn signal relay connected to energize the respective signals, interlock means actuated by each relay when energized to prevent operation of the other relay, each relay including a self-holding contact, manually operable means for selectively energizing the relays, and manually operable means for deenergizing the relays.

2. A turn signal system comprising, in combination, right and left turn signals, a right turn signal relay and a left turn signal relay connected to energize the respective signals, interlock means actuated by each relay when energized to prevent operation of the other relay, each relay including a self-holding contact, manually operable means for selectively energizing the relays, and manually operable means for deenergizing the relays including a manually operable switch independent of steering wheel rotation and a switch actuated by steering wheel rotation.

3. A turn signal system comprising, in combination, right and left turn signals, a right turn signal relay and a left turn signal relay connected to energize the respective signals, interlock means actuated by each relay when energized to prevent operation of the other relay, each relay including a self-holding contact, manually operable means for selectively energizing the relays, and steering shaft operable means for deenergizing the relays.

4. A direction silgnal system comprising, in combination, a steering column, a steering shaft therein, a switch member mounted in the column for rotation around the shaft, means biasing the switch member to a central position, a radially movable handle coupled to the switch member, a holding contact on the handle normally biased into engagement with and grounded by the steering shaft, right and left signal contacts energized by rotation of the switch member in opposite directions from its central position, a current source, right and left turn relays energized from the source through the corresponding signal contact and the holding contact, the relays having front contacts paralleling the signal contacts, and turn signal circuits energized by the relays.

5. A direction signal system comprising, in combination, a steering column, a steering shaft therein, a switch member mounted in the column for rotation around the shaft, means biasing the switch member to a central position, a holding contact on the member normally in engagement with and grounded by the steering shaft, manually operable means for disengaging the holding contact from the shaft, a non-conducting sector on the steering shaft engageable with the contact upon rotation of the steering shaft from its normal position, right and left signal contacts energized by rotation of the switch member in opposite directions from its central position, a current source, right and left turn relays energized from the source through the corresponding signal contact and the holding contact, the relays having front contacts paralleling the signal contacts, means interlocking the relays to prevent concurrent actuation of both relays, and turn signal circuits energized by the relays.

6. A direction signal system comprising, in combination, a steering column, a steering shaft therein, a switch member mounted in the column for rotation around the shaft, means biasing the switch member to a central position, a radially movable handle coupled to the switch member, a holding contact on the handle normally biased into engagement with and grounded by the steering shaft, a non-conducting sector on the steering shaft engageable with the contact upon rotation of the steering shaft from its normal position, right and left signal contacts energized by rotation of the switch member in opposite directions from its central position, a current source, right and left turn relays energized therefrom through the corresponding signal contact and the holding contact, the relays having front contacts paralleling the signal contacts, and turn signal circuits energized by the relays.

7. A direction signal system comprising, in combination, a steering column, a steering shaft therein, a switch member mounted in the column for rotation around the shaft, means biasing the switch member to a central position, a radially movable handle coupled to the switch member, a holding contact on the handle normally biased into engagement with and grounded by the steering shaft, a non-conducting sector on the steering shaft engageable with the contact upon rotation of the steering shaft from its normal position, right and left signal contacts energized by rotation of the switch member in opposite directions from its central position, a current source, right and left turn relays energized from the source through the corresponding signal contact and the holding contact, the relays having front contacts paralleling the signal contacts, means interlocking the relays to prevent concurrent actuation of both relays, and turn signal circuits energized by the relays.

8. A direction signal switch comprising, in combination, a steering column, a steering shaft therein, a switch member mounted in the column for rotation around the shaft, means biasing the switch member to a central position, a radially movable handle coupled to the switch member, a holding contact on the handle normally biased into engagement with and grounded by the steering shaft, and a non-conducting sector on the steering shaft engageable with the contact upon rotation of the steering shaft from its normal position.

References Cited in the file of this patent

UNITED STATES PATENTS

| | | |
|---|---|---|
| 1,973,299 | Swartout | Sept. 11, 1934 |
| 2,108,454 | Steinman | Feb. 15, 1938 |
| 2,186,766 | Metcalf | Jan. 9, 1940 |
| 2,225,732 | Bedford | Dec. 24, 1940 |
| 2,269,499 | Wharam, et al. | Jan. 13, 1942 |
| 2,521,304 | North | Sept. 5, 1950 |

FOREIGN PATENTS

| | | |
|---|---|---|
| 575,457 | Germany | Apr. 28, 1933 |